United States Patent
Matsuda et al.

(10) Patent No.: US 11,255,458 B2
(45) Date of Patent: Feb. 22, 2022

(54) VALVE DEVICE AND FLUID CONTROL DEVICE

(71) Applicant: FUJIKIN INCORPORATED, Osaka (JP)

(72) Inventors: Takahiro Matsuda, Osaka (JP); Kenji Aikawa, Osaka (JP); Toshiyuki Inada, Osaka (JP); Kazunari Watanabe, Osaka (JP); Yuta Motegi, Osaka (JP); Tomohiro Nakata, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/038,440

(22) Filed: Sep. 30, 2020

(65) Prior Publication Data

US 2021/0131583 A1   May 6, 2021

(30) Foreign Application Priority Data

Oct. 31, 2019  (JP) .............................. JP2019-198505

(51) Int. Cl.
*F15B 13/00* (2006.01)
*F16K 31/126* (2006.01)
*F16K 11/02* (2006.01)

(52) U.S. Cl.
CPC .......... *F16K 31/126* (2013.01); *F16K 11/022* (2013.01); *Y10T 137/87885* (2015.04)

(58) Field of Classification Search
CPC ........... Y10T 137/87885; F16K 27/003; F15B 13/0832
See application file for complete search history.

(56) References Cited

U.S. PATENT DOCUMENTS

| | | | | |
|---|---|---|---|---|
| 4,703,913 A | * | 11/1987 | Hunkapiller | ......... B01J 19/0046 137/606 |
| 6,615,871 B2 | * | 9/2003 | Ohmi | .................. F15B 13/0896 137/884 |
| 9,212,755 B2 | * | 12/2015 | Kuriki | ................... F16K 27/003 |
| 2006/0096533 A1 | * | 5/2006 | Mochizuki | ............ F16K 27/003 118/715 |

(Continued)

FOREIGN PATENT DOCUMENTS

JP   2002-206700   7/2002
WO   WO2017/221893   12/2017

*Primary Examiner* — Robert K Arundale
(74) *Attorney, Agent, or Firm* — Greenblum & Bernstein, P.L.C.

(57) ABSTRACT

A valve device includes: a body having a substantially block shape in which first and second valve chambers are recessed from an upper surface, and three flow paths communicating with the first valve chamber and three flow paths communicating with the second valve chamber are formed inside the body; first and second valve members disposed in the first and second valve chambers, respectively, to switch between communication and disconnection between one of the three flow paths and the other two flow paths; and first and second actuators for respectively driving the first and second valve members, wherein the other two flow paths communicating with the each of valve chambers have respective ports on the lower surface of the body, while the one flow path has a common port on the lower surface of the body.

10 Claims, 12 Drawing Sheets

(56) References Cited

U.S. PATENT DOCUMENTS

| | | | |
|---|---|---|---|
| 2009/0165872 A1* | 7/2009 | Moriya | F17D 1/04 137/596.12 |
| 2009/0183792 A1* | 7/2009 | Tokuda | F15B 13/0892 137/798 |
| 2020/0278049 A1* | 9/2020 | Watanabe | F16K 1/42 |
| 2021/0132638 A1* | 5/2021 | Aikawa | F16K 27/003 |
| 2021/0199205 A1* | 7/2021 | Watanabe | F16K 7/16 |

* cited by examiner

VALVE DEVICE AND FLUID CONTROL DEVICE

CROSS-REFERENCE TO RELATED APPLICATIONS

This application is based upon and claims the benefit of priority from the Japanese Patent Application No. 2019-198505, filed Oct. 31, 2019 the entire content of which is incorporated herein by reference.

FIELD OF THE INVENTION

The present invention relates to valve device and fluid control device.

DESCRIPTION OF THE BACKGROUND ART

Conventionally, various valve device are used for distribution and shut-off control and flow rate control of process gases and the like used in the semiconductor manufacturing process, and in particular, diaphragm valves are often used for the purpose of maintaining airtightness.

These valve devices, together with other fluid devices, are commonly incorporated into integrated fluid control systems. For example, in the fluid control system shown in Patent Literature 1, fluid devices form a line from upstream to downstream, and a plurality of such lines are arranged in rows. The width of each line is unified to 1.125 inches (approx. 29 mm) in the standard, and the width of each fluid device is also unified to this dimension.

However, because of the requirement for improved responsiveness of flow control, miniaturization of fluid control device is required so that fluid device can control the fluid near the processing chamber. In the system of Patent Literature 2, for miniaturization, the width of each line is standardized to be 10 mm, and fluid devices such as new valves conforming to this standard have also been developed.

In such fluid control systems, purge gas manifolds are provided in directions perpendicular to the lines, and purge gas supply ports are provided at intersections of the purge gas manifolds with the respective lines to supply purge gas such as $N_2$ to the respective lines.

A three-way valve is provided at each connection point, and the gas flowing downstream of the connection point is switched between the process gas and the purge gas in cooperation with open-close valve provided immediately upstream of each connection point.

PATENT LITERATURE

PTL 1: Japanese Laid-Open Patent Application No. 2002-206700
PTL 2: International Publication WO 2017/221893

SUMMARY OF INVENTION

Technical Problem

However, there are many 1.125 inch fluid control systems, and there is also a need to retrofit them to place two 10 mm lines in a single line space to increase the number of lines. In that case, there is a problem that the pitch of the supply port of the purge gas manifold (corresponding to 1.125 inch) does not match the arrangement pitch of the 10 mm line. Of course, there is also a method of interposing a branch joint block for subdividing the arrangement pitch of the supply port for the 1.125 inch line to the arrangement pitch of the supply port for the 10 mm line, there is a problem that the number of parts increases and the parts cost and assembly cost increase.

An object of the present invention is to solve the above-mentioned problem and to provide a valve device capable of connecting to purge gas manifolds (corresponding to 1.125 inches) and allowing gas to flow into two gas lines.

Solution to Problem

The valve device of the present invention comprises: a body having a substantially block shape in which a first valve chamber and a second valve chamber are recessed from an upper surface, and first to third flow paths communicating with the first valve chamber and fourth to sixth flow paths communicating with the second valve chamber are formed inside the body;

a first valve member disposed in the first valve chamber and configured to switch between communication and disconnection between the second and third flow paths and the first flow path, while maintaining communication between the second and third flow paths;

a second valve member disposed in the second valve chamber and configured to switch communication and disconnection between the fifth and sixth flow paths and the fourth flow path while maintaining communication between the fifth and sixth flow paths; and first and second actuators for driving the first and second valve members, respectively, wherein the second, third, fifth and sixth flow paths have respective ports on a lower surface of the body, while the first flow path and the fourth flow path have a common port on a lower surface of the body.

With this configuration, from one supply port of the manifold of the old standard, purge gas is introduced through the common port into the first and fourth flow path, it is controlled in the first and second valve chambers, and for example, flown through the third and sixth outlet passages. Accordingly, the purge gas can be supplied to the two gas lines through one of valve device.

Here, a valve element constituted by the first valve chamber, the first to third flow paths, the first valve member and the first actuator to be described later, is also referred to as a "first valve element." Similarly, a valve element constituted by the second valve chamber, the fourth to sixth flow paths, the second valve member and a second actuator to be described later, is also referred to as a "second valve element."

Preferably, the configuration may be such that on the lower surface of the body, the second and fifth flow paths have respective ports on one end side in a first direction, which is a flow direction, the third and sixth flow paths have respective ports on the other end side in the first direction, and the first and fourth flow paths have a common port at a substantially middle position.

With this configuration, by disposing the valve device so as to straddle the purge gas manifold so that the "first direction" is aligned to the line direction of the fluid control device, the valve device can be connected to the supply port of the purge gas manifold, it can be connected to one or two upstream side lines (open-close valve or the like) via a joint block at one end side, and it can be connected to one or two downstream side lines (flow control device or the like) via a joint block at the other end side.

Preferably, the configuration may be such that in a top view, the first and second valve chambers are arranged in the first direction of the body, and through-holes vertically penetrating the body may be provided on both end sides of the body in a second direction perpendicular to the first direction.

With this configuration, the valve device can be fixed by screwing fixing bolts through the through-holes into pre-existing screw holes provided in the purge gas manifold of the old standard.

Preferably, a configuration in which two types of through-holes having different diameters are provided as the through-holes can be adopted.

With this configuration, in the valve device, —fixing bolts can be screwed through the small-diameter through-holes into small-diameter screw holes of the manifold, while fixing bolts can be screwed through the large-diameter through-holes into large-diameter screw holes of the joint block.

Preferably, the ports of the second, third, fifth and sixth flow paths are different in diameter from the common port of the first flow path and the fourth flow path.

With this configuration, the common port can be matched to the diameter of the one supply port of the old standard purge gas manifold, while the second, third, fifth and sixth flow path ports can be matched to the diameter of the connection port of the two gas lines, and thereby all ports can be hermetically connected via appropriate gaskets.

Preferably, the configuration may be such that in a top view, the ports of the second, third, fifth, and sixth flow paths and the through-holes may be arranged to be 180 degree-inversion symmetric with respect to the common port of the first and fourth flow paths.

This configuration allows the valve device to be inverted 180 degrees to be connected to the manifold and the joint blocks and used in a similar manner.

Preferably, the total internal volume of the second and third flow paths and the total internal volume of the fifth and sixth flow paths are substantially the same.

With this configuration, since the process gas lines passing through the first valve element and the second valve element 110b, respectively, becomes equal in the pressure loss and responsiveness of, the interchangeability of the two gas lines is improved.

Preferably, a configuration may be employed in which the dimension of the body in the second direction is 1.125 inches or less.

This configuration allows valve device to be placed in the spaces of one old standard line.

Preferably, a configuration may be employed in which the first and second valve members are diaphragms.

Preferably, a configuration may be employed in which the first and second actuators are air cylinder actuators.

The fluid control device of the present invention comprises: at least two lines arranged in parallel and each including a plurality of fluid devices arranged in one direction via joint blocks; and a manifold disposed so as to be orthogonal to the lines and passing between the joint blocks of the lines, wherein the plurality of fluid devices includes any of the above valve device, the valve device is disposed so as to starddle the manifold, the common port of the first and fourth flow paths is connected to a port of the manifold, the ports of the second and fifth flow paths are connected to respective lines of fluid devices via joint blocks on one side of the manifold, and the ports of the third and sixth flow paths are connected to respective lines of fluid devices via joint blocks on the other side of the manifold.

Advantageous Effects of Invention

According to the present invention, purge gas can be introduced from one inlet of the purge gas manifold into the first and fourth flow path, controlled in the first and second valve chambers, and flowed, for example, to the third and sixth flow path, so that the purge gas can be supplied to the two gas lines via one valve device.

Accordingly, it is possible to provide a valve device that can be connected to the purge gas manifold of the old standard to flow the gas to the two gas lines.

DESCRIPTION OF EMBODIMENTS

First Embodiment

Hereinafter, valve devices according to embodiments of the present invention will be described with reference to the drawings.

Figure 1:
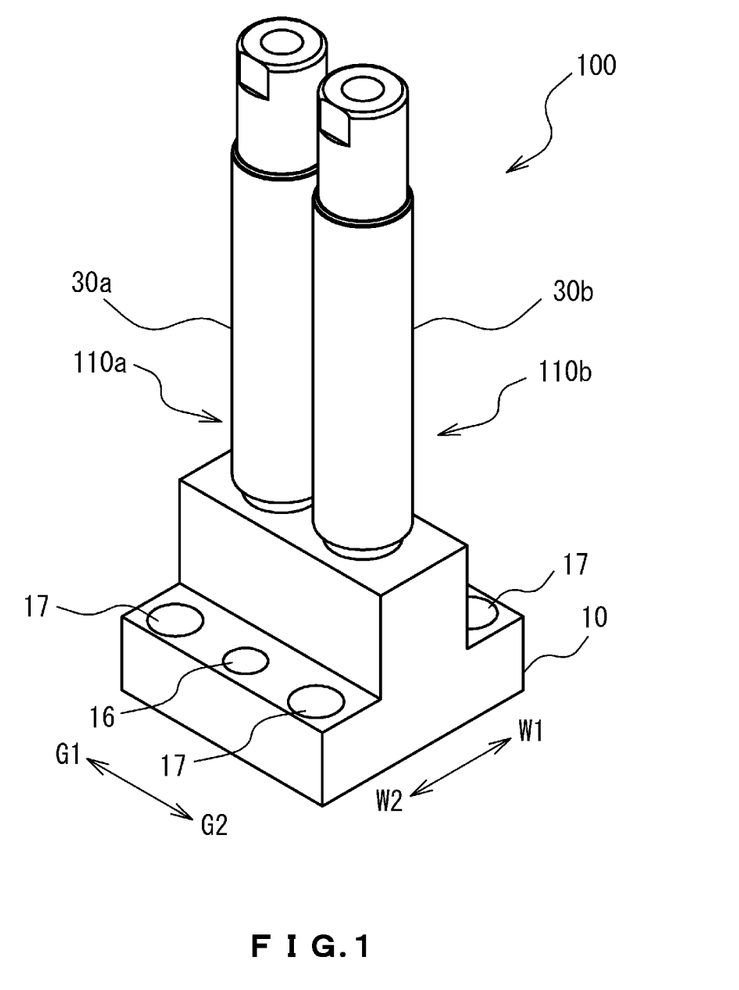
FIG. 1 is an external perspective view showing a valve device of an embodiment of the present invention.
Figure 2:
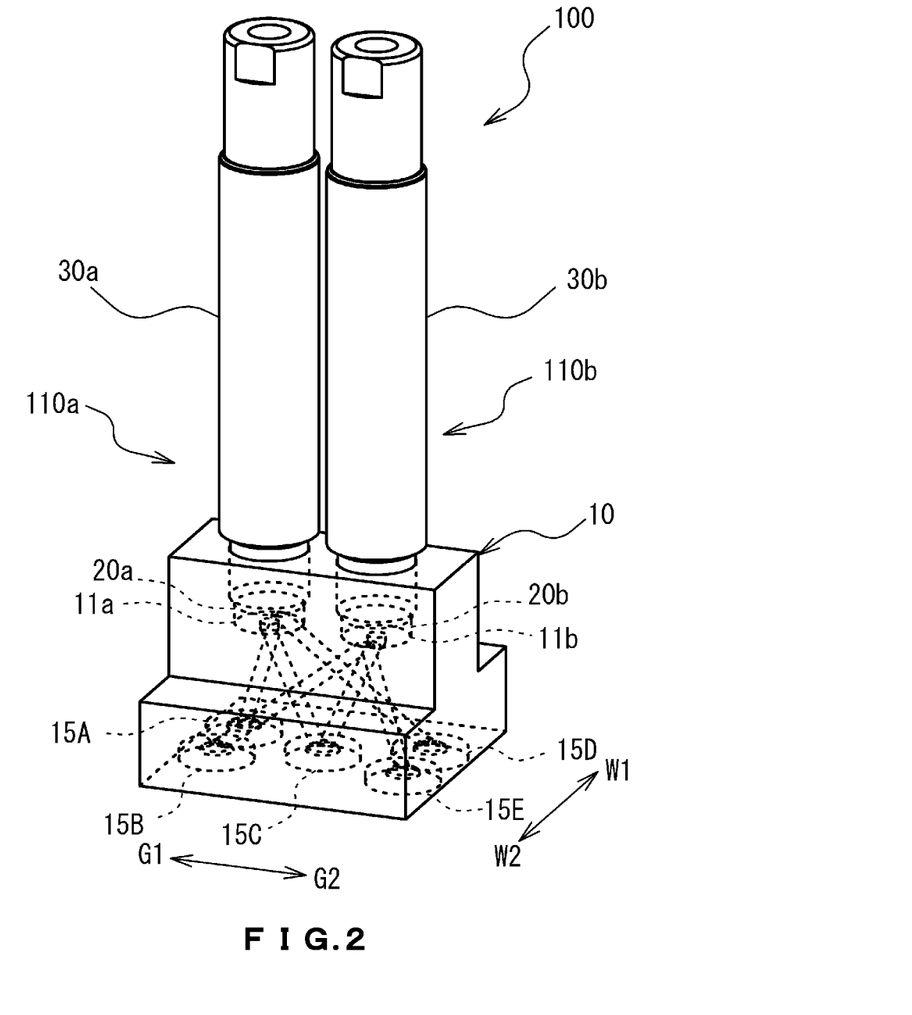
FIG. 2 is an external perspective view showing fluid passages in the valve device of FIG. 1 by broken lines.

FIG. 1 is an external perspective view showing a valve device according to the first embodiment, and FIG. 2 is an external perspective view showing fluid passages in the valve device of FIG. 1 by broken lines.

The valve device 100 of this embodiment includes a body 10, first and second valve bodies 20a and 20b (see FIGS. 4A and 4B), and first and second actuators 30a and 30b.

Figure 3A:
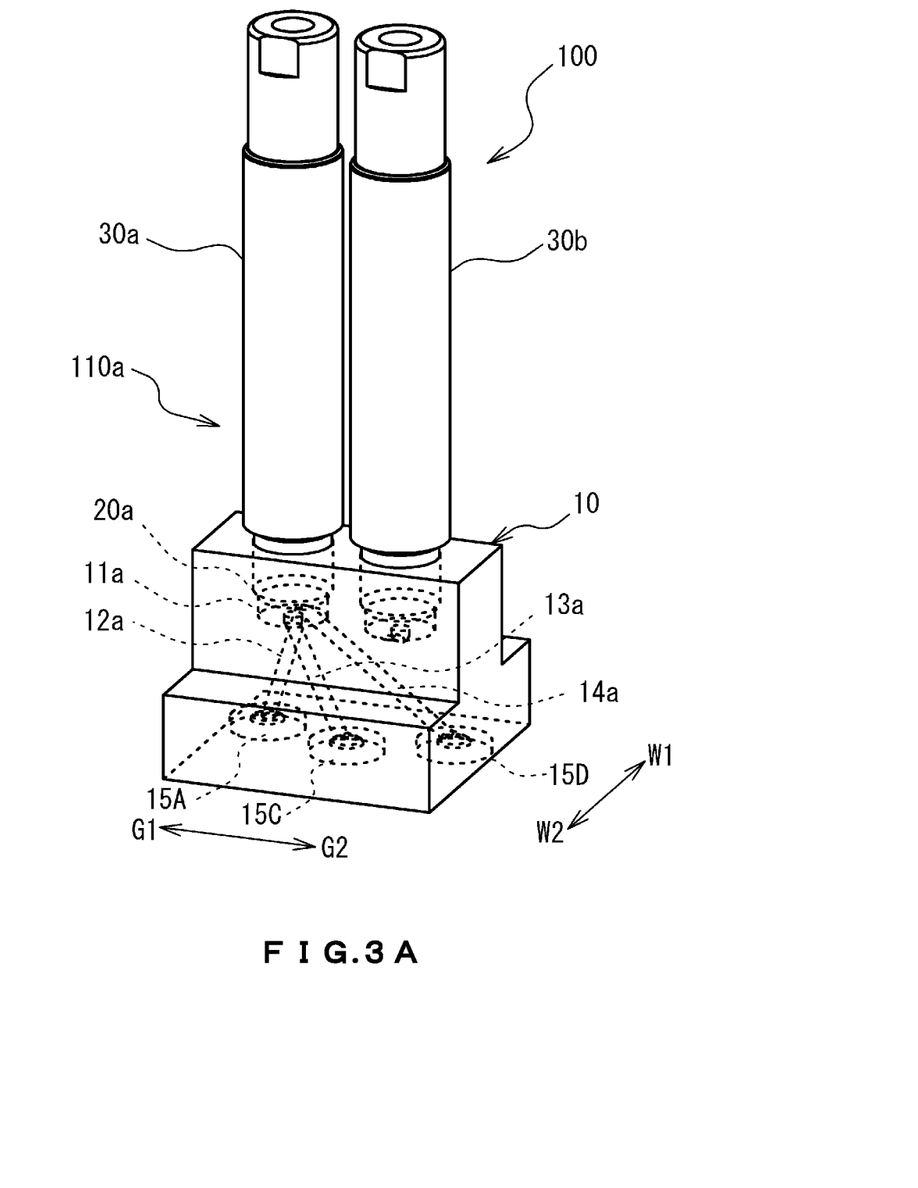
FIG. 3A is a view showing only fluid passages constituting the first valve element, of the fluid passages in the external perspective view of FIG. 2.
Figure 3B:
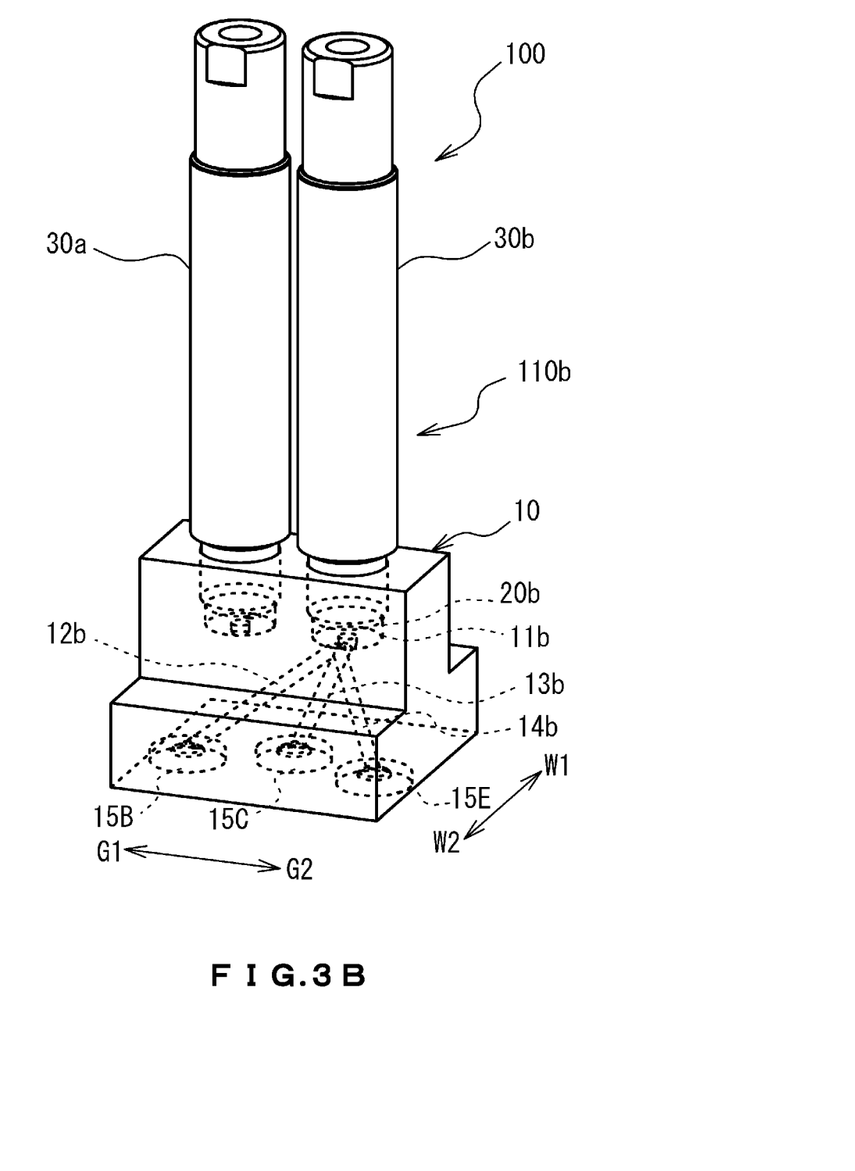
FIG. 3B is a view showing only fluid passages constituting the second valve element, of the fluid passages in the external perspective view of FIG. 2.

The body 10 has a substantially block-shape, and the first valve chamber 11a and the second valve chamber 11b, which are cylindrical recesses, are bored from the upper surface. As shown in FIGS. 3A and 3B, a first flow path 13a, a second flow path 12a, and a third flow path 14a, which each communicate with the first valve chamber 11a, and a fourth flow path 13b, a fifth flow path 12b, and a sixth flow path 14b, which each communicate with the second valve chamber 11b, are formed inside the body 10.

The valve element constituted by the first valve chamber 11a, the first to third flow path 13a, 12a, and 14a, the first valve member 20a and a first actuator 30a, which will be described later, is also referred to as a "first valve element 110a". Similarly, the valve element constituted by the second valve chamber lib, the fourth to sixth flow path 13b, 12b, and 14b, the second valve member 20b and the second actuator 30b, which will be described later, is also referred to as a "second valve element 110b."

On the lower surface of the body 10, the second and fifth flow paths 12a, 12b have respective ports 15A, 15B on one end G1 side in a first direction (G1-G2, "flow direction"), the third and sixth flow paths 14a, 14b have respective ports 15D, 15E on the other end G2 side, and the first and fourth flow paths 13a, 13b have a common port 15C at a substantially central position.

With this configuration, by disposing the valve device 100 so as to straddle the purge gas manifold so that the flow direction (G1-G2) is aligned to the line direction, the valve device 100 can be connected to the supply port of the purge gas manifold, and it can be connected to one or two upstream side lines (open-close valve or the like) via joint blocks at the one end G1 side, and it can be connected to one or two downstream side lines (flow control device or the like) via joint blocks at the other end G2 side.

Figure 5A:
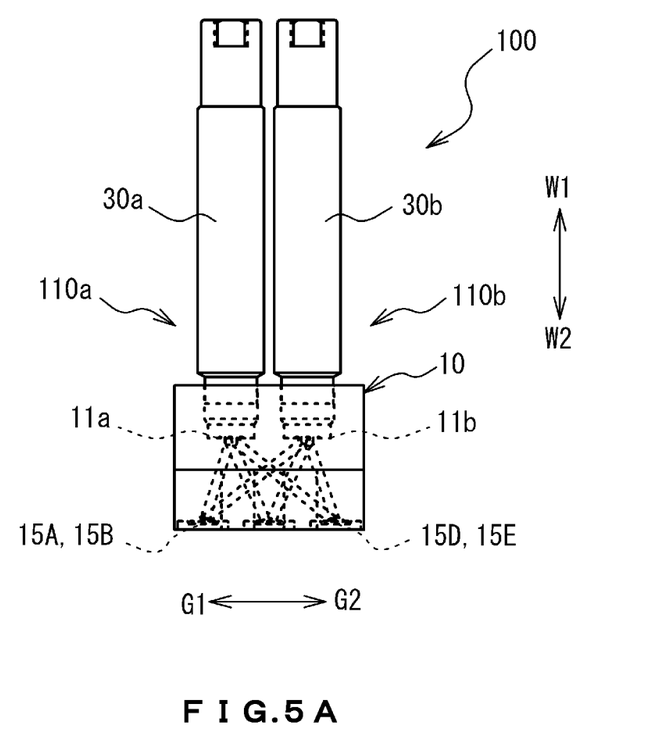
FIG. 5A is a front view showing the valve device of FIG.
Figure 5B:
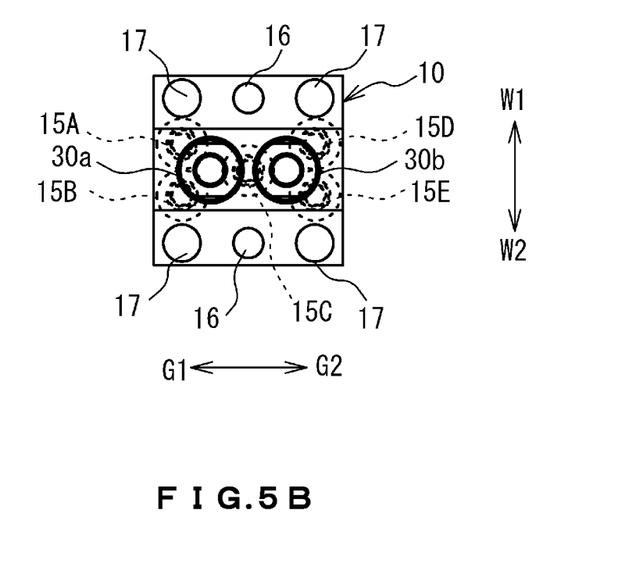
FIG. 5B is a plan view showing the valve device of FIG.

As shown in FIGS. 5A and 5B, in top view, the first and second valve chambers 11a and 11b are arranged in the flow direction (G1-G2) of the body 10, and through-holes 16 and 17 penetrating the body 10 in the vertical direction are provided on both end sides in the perpendicular second direction (W1-W2, it may be referred to as "widthwise direction").

The through-hole 16 is a small-diameter through-hole, through which the fixing screw is screwed into a pre-existing small-diameter screw hole of the manifold, so that the present valve device 100 can be fixed to the old standard purge gas manifold.

The through-hole 17 is a large-diameter through-hole, through which the fixing screw is screwed into a large-diameter screw hole of the joint block, so that the present valve device 100 can be connected to these joint blocks.

That is, by arranging the first and second valve chambers 11a and 11b in the flow direction (G1-G2), the through-holes 16 and 17 can be provided on both end portions in the width direction (W1-W2) even when the width of the body 10 is 1.125 inches or the like.

The ports 15A, 15B, 15D and 15E of the second, third, fifth and sixth flow paths differ in diameter from the common port 15C of the first and fourth flow path. With this arrangement, the common port can be matched to the diameter of one supply port of the old standard purge gas manifold, while the ports of the second, third, fifth and sixth flow paths can be matched to the diameter of the connection ports of the two gas lines, and thereby all ports can be hermetically connected via appropriate gaskets.

As shown in FIGS. 5A and 5B, in a top view, the ports 15A, 15D, 15B, and 15E of the second, third, fifth, and sixth flow paths 12a, 14a, 12b, and 14b, respectively, and the through-holes 16 and 17 are arranged at positions that are 180 degree-inversion symmetric with respect to the common port 15C of the first and fourth flow paths.

This arrangement also allows the valve device to be reversely connected to the manifold and to the respective joint blocks.

The total internal volume of the second and third flow paths 12a, 14a and the total internal volume of the fifth and sixth flow paths 12b, 14b are substantially the same.

With this configuration, since the process gas lines passing through the first valve element 110a and the second valve element 110b, respectively, becomes equal in the pressure loss and responsiveness of, the interchangeability of the two gas lines is improved.

In the present embodiment, the width-direction (W1-W2) dimension of the body 10 is 1.125 inches (about 29 mm). This arrangement allows the valve device to be placed in the spaces of one old standard line.

The first valve member 20a is provided in the first valve chamber 11a, and while constantly maintaining communication between the second flow path 12a and the third flow path 14a, switches the communication/disconnection between these flow paths and the first flow path 13a. Similarly, the second valve member 20b is provided in the second valve chamber 11b, and while constantly maintaining communication between the fifth flow path 12b and the sixth flow path 14b, switches the communication/disconnection between these flow paths and the fourth flow path 13b.

In the present embodiment, diaphragms are used as the first and second valve members 20a and 20b. The use of a diaphragm as a valve element is preferable in terms of ensuring a high air-tightness of the gas flow path against the outside. The first and second valve members 20a and 20b are not limited to diaphragms and may be various valve members.

Figure 4A:
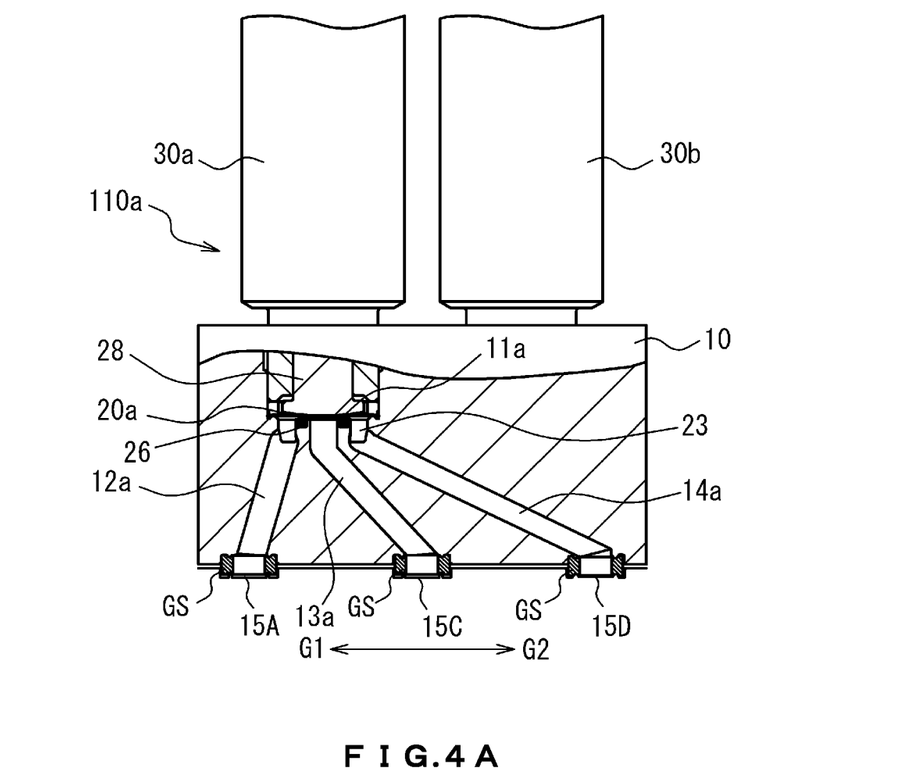
FIG. 4A is a partial cross-sectional view showing the detail of the first valve element of the valve device of FIG. 1.

FIG. 4A shows a partial cross-sectional view showing a detail of the first valve element 110a.

The second, first, and third flow paths 12a, 13a, 14a from the respective ports 15A, 15C, 15D, open to bottom surface of the first valve chamber 11a. Of these, the second and third flow paths 12a, 14a constantly communicate with each other through the circumferential groove 23 of bottom surface of the first valve chamber 11a, while the first flow path 13a communicates with the second and third flow paths 12a, 14a through a gap between the valve seat 26 disposed around the opening and the diaphragm 20a disposed thereon. The diaphragm 20a is brought into contact with and spaced from the valve seat 26 by a diaphragm presser 28 driven by the first actuator 30a, thereby opening and closing the gap, thereby switching the communication and disconnection between the first flow path 13a and the second and third flow paths 12a, 14a.

Figure 4B:
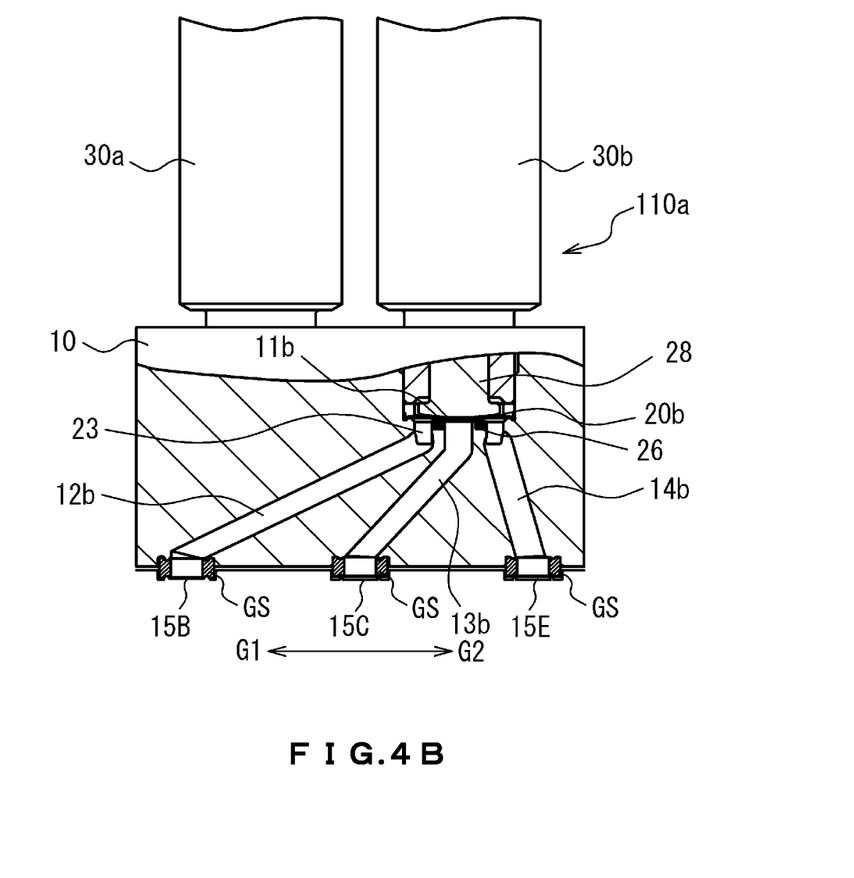
FIG. 4B is a partial cross-sectional view showing the detail of the second valve element of the valve device of FIG.

The second valve element 110b is not described, but is similar in construction to the first valve element 110a, as shown in a partial cross-sectional view of FIG. 4B.

The first and second actuators 30a, 30b are provided to drive the first and second valve elements 20a, 20b, respectively. In the present embodiment, air cylinder actuators are used as the first and second actuators 30a and 30b. Although not shown in detail, the air cylinder actuators 30a and 30b operate by turning ON/OFF of drive air supplied from the outside.

For example, when the drive air is OFF, the air cylinder actuator 30a does not operate and a coil spring (not shown) pushes down the diaphragm presser 28 to bring the diaphragm 20a into contact with the valve seat 26, and thereby the present valve device is closed. On the other hand, when the drive air from the outside is turned on, the air cylinder actuator 30*a* pulls up the diaphragm presser 28 by overcoming the pressing force of the coil spring, separating the diaphragm 20*a* from the valve seat 26, thereby opening the present valve device. The air cylinder actuator 30*b* also operates in the same manner.

A valve (air operated valve) that is opened and closed by an air cylinder actuator has an advantage of being able to control a large flow rate with a small electric power of a solenoid valve which controls the drive air.

However, the actuator is not limited to an air cylinder actuator, it may be a solenoid actuator or a piezo actuator or the like.

Next, operation of the valve device 100 according to the present embodiment configured as described above will be described with reference to FIG. 4A by taking the first valve element 110*a* as an example.

In the initial state, the supply of the drive air is OFF, the air cylinder actuator 30*a* does not operate, and the coil spring (not shown) pushes down the diaphragm presser 28 to bring the diaphragm 20*a* into contact with the valve seat 26, and the present valve device is closed. At this time, the second flow path 12*a* and the third flow path 14*a* communicate through the circumferential groove 23, but the connection between these flow paths and the first flow path 13*a* is cut off by the contact between the diaphragm 20*a* and the valve seat 26.

Next, when the drive air from the outside is turned on, the air cylinder actuator 30*a* pulls up the diaphragm presser 28 by overcoming the pressing force of the coil spring, separating the diaphragm 20*a* from the valve seat 26, thereby opening the present valve device. At this time, the second flow path 12*a* and the third flow path 14*a* continue to communicate with each other through the circumferential groove 23, and these flow paths and the first flow path also communicate with each other through the gap between the diaphragm 20*a* and the valve seat 26.

The second valve element 110*b* operates similarly to switch communication and disconnection between the fifth and sixth flow paths and the fourth flow path.

Incidentally, in the present embodiment, description has been made to the valve of normally closed configuration which is closed in normal time and open when the valve is operated, but the valve device of the present invention is not limited thereto, and it may be of a normally open configuration. For example, while the valve device of this embodiment is configured so that the coil springs (not shown) push down the diaphragm pressers 28 and the air cylinder actuators 30*a*, 30*b* push up the diaphragm pressers 28, the valve device may be configured so that the coil springs (not shown) pull up the diaphragm pressers 28 and the air cylinder actuators 30*a*, 30*b* push down the diaphragm pressers 28 to realize a normally open configuration.

Second Embodiment

Next, the fluid control device of the present invention will be explained.

Figure 6:
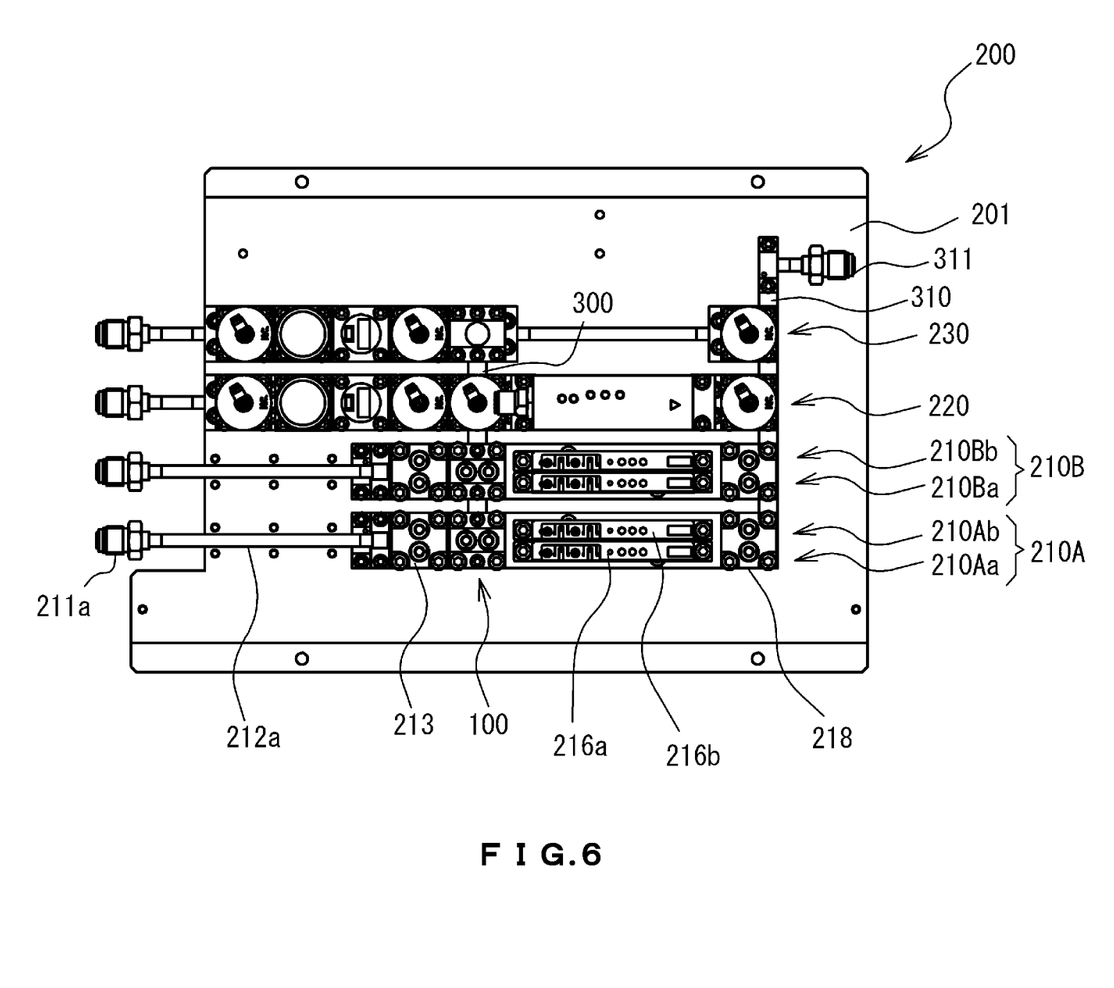
FIG. 6 is a plan view showing a fluid control device of an embodiment of the present invention.
Figure 7:
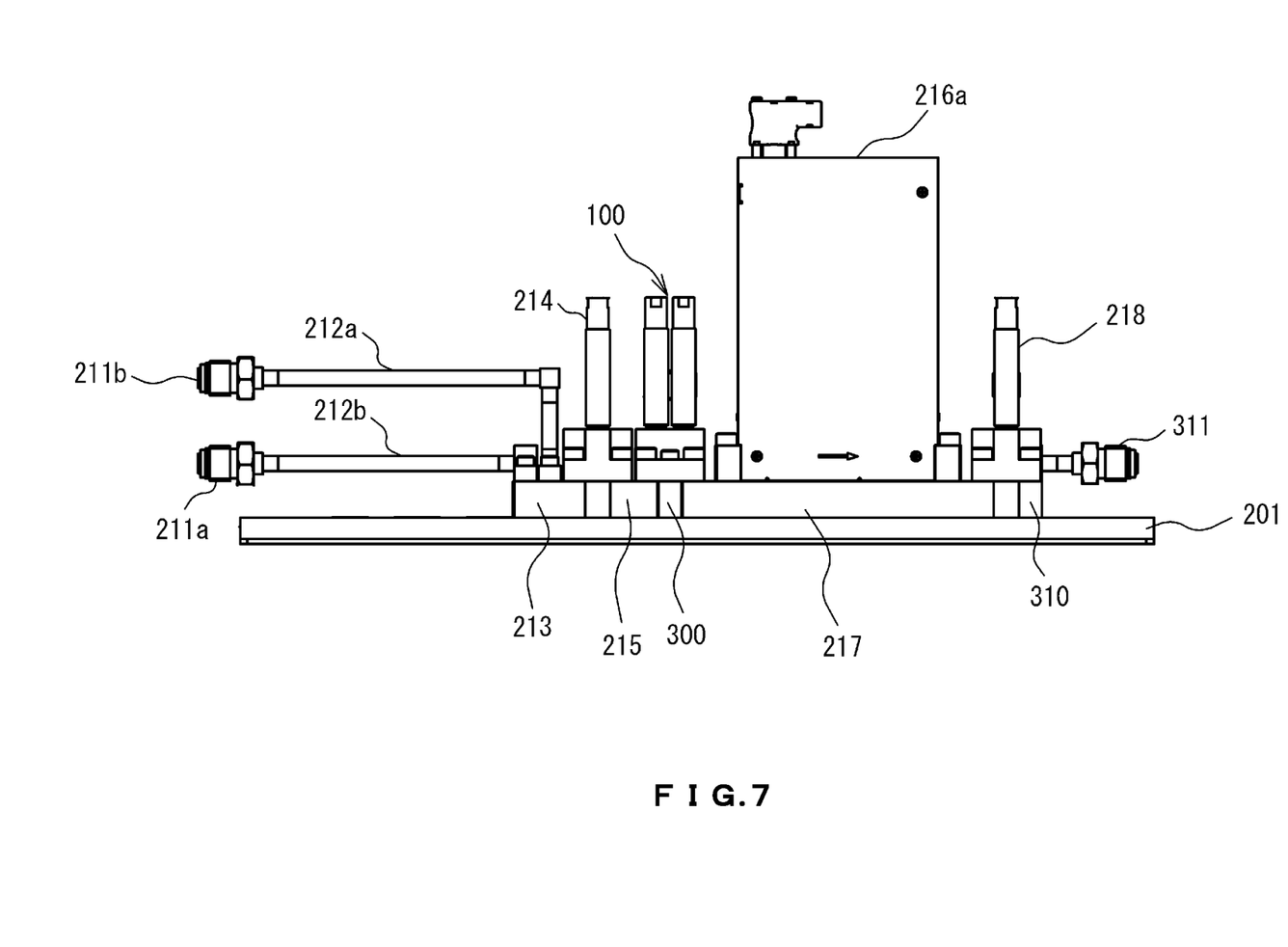
FIG. 7 is a front view showing the fluid control device of FIG. 6 (fluid device or the like of the back-side line is not shown).

FIG. 6 is a plan view showing a fluid control device according to an embodiment of the present invention, and FIG. 7 is a front view. Here, in FIG. 7, fluid devices or the like of the back-side line of FIG. 6 are not shown.

The fluid control device 200 of the present embodiment is an apparatus used in a semiconductor manufacturing process and performing flow rate control and ON/OFF control of process gases and a purge gas to be supplied to a processing chamber.

The fluid control device 200 includes lines 210A, 210B, 220, 230 each consisting of a plurality of fluid devices arranged in one direction on the base plate 201 via joint blocks, and a purge gas-suppling manifold 300 which passes between the joint blocks of these lines and is arranged to be perpendicular to each line.

Lines 210A, 210B, 220 are process gas lines, and line 230 is a purge gas line, and the gases are supplied from the respective source through left end fittings into the respective lines, controlled in the lines, fed through an output manifold 310 at the right end, and output from the fitting 311.

The lines 220 and 230 are lines having a width of 1.125 inches, and the lines 210A and 210B each includes two lines each having a width of 10 mm in a space of the line having a width of 1.125 inches.

For example, the line 210A includes a sub-line 210Aa and a sub-line 210Ab each having a width of 10 mm. In each of the sub-lines 210Aa and 210Ab, joints 211*a* and 211*b* for introducing the process gas, pipes 212*a* and 212*b*, a common joint block 213, and a two-way valve 214 are connected in this order from the left side. The two-way valve 214 includes two open-close valves arranged in parallel, and independently opens and closes the respective sub-lines 210Aa and 210Ab.

Furthermore, it is connected to a common joint block 215, the valve device 100 of the present invention, a joint block 217, mass flow controllers 216*a*, 216*b* for the respective sub-lines 210Aa, 210Ab, a two-way valve 218 of the same construction as the two-way valve 214 and the output manifold 310 in this order.

The line 210B includes a sub-line 210Ba and a sub-line 210Bb each having a width of 10 mm, and has a similar configuration.

Figure 8A:
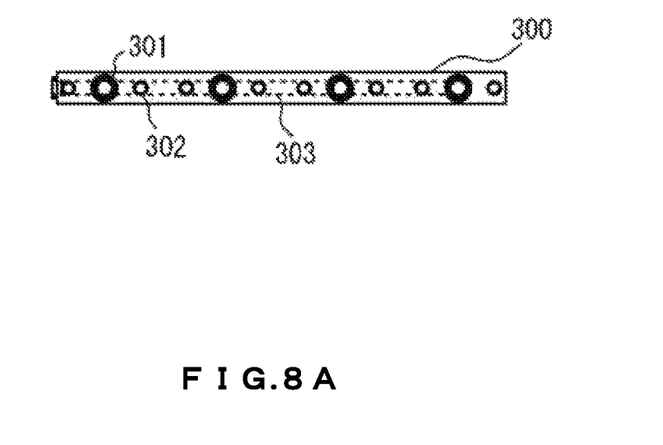
FIG. 8A is a plan view showing the purge gas manifold of the fluid control device of FIG. 6.
Figure 8B:
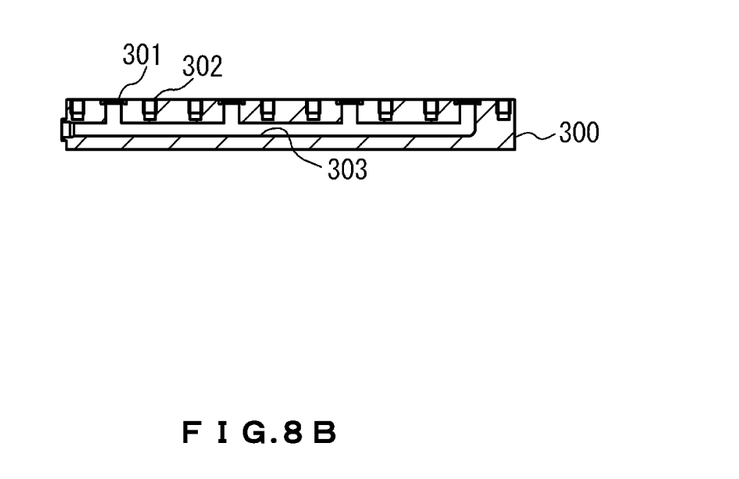
FIG. 8B is a longitudinal sectional view showing the purge gas manifold of the fluid control device of FIG. 6.

On the other hand, the purge gas manifold 300 receives a purge gas from the line 230 and supplies the purge gas to the other lines 210A, 210B, and 220. The manifold 300 is, as shown in FIGS. 8A and 8B, a prismatic member, in which the connection ports 301 opening to upper surface communicate with one another through a longitudinal flow path 303 inside the manifold. Further, on upper surface side, screw hole 302 are provided, so that the fluid devices can be connected.

Figure 9A:
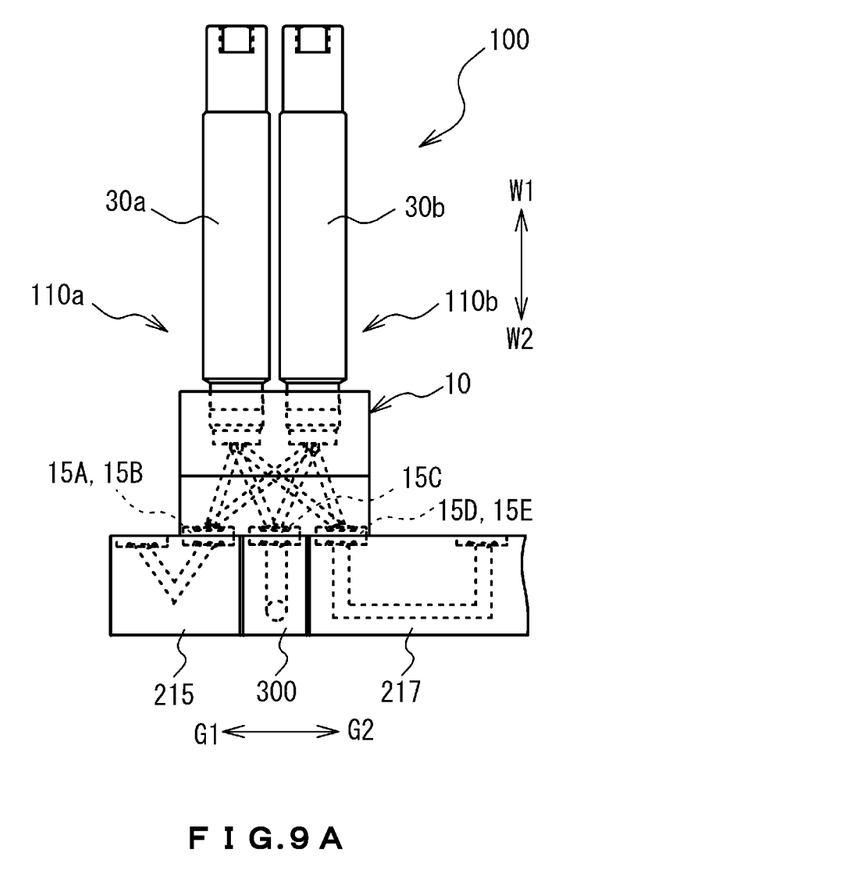
FIG. 9A is a front view showing the connecting status of the valve device of FIG. 1 in the fluid control device of FIG. 6.
Figure 9B:
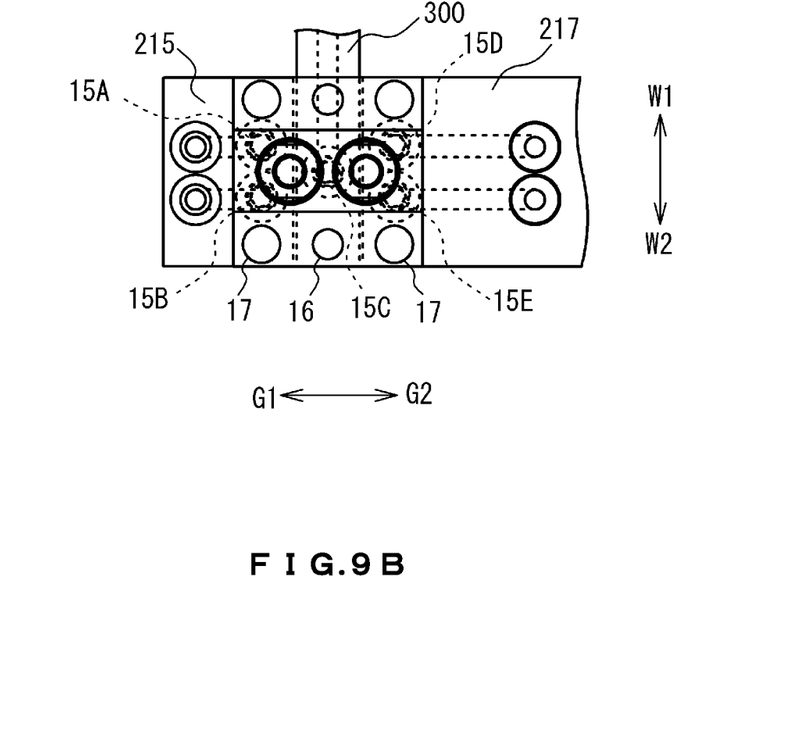
FIG. 9B is a plan view showing the connecting status of the valve device of FIG. 1 in the fluid control device of FIG. 6.

The valve device 100 of the present invention, as shown in FIG. 9A and FIG. 9B, is arranged so as to straddle the manifold 300 and is fixed to the manifold 300 by two bolts (not shown) screwed into the screw holes 302 (see FIG. 8A and FIG. 8B) of the manifold 300 through the through-holes 16. Further, it is fixed to the joint block 215 by two bolts (not shown) screwed into the screw holes (not shown) of the upstream side joint block 215 through the through-holes 17, further, it is fixed to the downstream side joint block 217 by two bolts (not shown) screwed into the screw holes (not shown) of the joint block 217 through the through-holes 17. Thus, referring to FIGS. 9A, 9B, 3A and 3B, the common port 15C of the first and fourth flow paths 13*a* and 13*b* of the valve device 100 is connected to the connection port 301 of the manifold 300. The ports 15A and 15B of the second and fifth flow paths 12*a* and 12*b* are connected to the upstream side portions of the sub-lines 210Aa and 210Ab, respectively, via the joint block 215 on the G1 side (upstream side) of the manifold, and the ports 15D and 15E of the third and sixth flow path 14*a* and 14*b* are connected to the downstream side portions of the sub-lines 210Aa and 210Ab, respectively, via the joint block 217 on the G2 side (downstream side) of the manifold 300.

At the respective connecting points, gaskets GS (see FIGS. 4A and 4B) are used to ensure airtightness.

In the fluid control device 200 of the present embodiment configured as described above, since the first valve element 110a of the valve device 100 can switch the communication and disconnection between the first flow path 13a from the manifold 300 and the second and third flow paths 12a and 14a forming a part of the sub-line 210Aa, it is possible to switch ON/OFF the supply of purge gas to the sub-line 210Aa. Similarly, the second valve element 110b can switch ON/OFF the supply of the purge gas to the sub-line 210Ab.

The switching of the gas type of the sub-line 210Aa is performed as follows. By opening the open-close valve of the upstream two-way valve 214 for opening and closing the sub-line 210Aa and closing the first valve element 110a of the valve device 100 (turning off the supply of purge gas), the process gas can flow downstream of the sub-line 210Aa. On the other hand, by closing the open-close valve of the two-way valve 214 for opening and closing the sub-line 210Aa and opening the first valve element 110a of the valve device 100 (turning on the supply of purge gas), the purge gas can flow downstream of the sub-line 210Aa. Thus, it is possible to switch the gas type flowing to the downstream side.

Also for the sub-line 212Ab, by similarly operating the open-close valve for opening and closing the sub-line 210Ab of the two-way valve 214 and the "second valve element 110b" of the valve device 100, it is possible to switch the gas type flowing to the downstream side.

According to this embodiment, by introducing the valve device of the present invention to the fluid control device, it is possible to connect the valve device to the purge gas manifold of the old standard to flow the gas to the two gas lines.

Note that the present invention is not limited to the above-described embodiments. Various additions, changes, and the like can be made by those skilled in the art within the scope of the present disclosure.

REFERENCE SIGNS LIST

10: Body
11a: First valve chamber
11b: Second valve chamber
12a: Second flow path
12b: Fifth flow path
13a: First flow path
13b: Fourth flow path
14a: Third flow path
14b: Sixth flow path
15A, 15B, 15C, 15D, 15E: Port
16, 17: Through-hole
20a: First valve member (diaphragm)
20b: Second valve member (diaphragm)
23: Circumferential groove
26: Valve seat
28: Diaphragm presser
30a: First actuator (air cylinder actuator)
30b: Second actuator (air cylinder actuator)
100: Valve device
110a: First valve element
110b: Second valve element
200: Fluid control device
201: Base plate
210A, 210B, 220, 230: Line
210Aa, 210Ab, 201Ba, 210Bb: Subline
211a, 211b: Joint
212a, 212b: Piping
213, 215, 217: Joint block
214, 218: Two-way valve
216a, 216b: Mass flow controller
300: Manifold
301: Connection port
303: Flow path
302: Screw hole
310: Output manifold
311: Fitting
G1-G2: First direction (flow direction)
G1: One end
G2: Other end
GS: Gasket

The invention claimed is:

1. A valve device comprising:
a body having a substantially block shape in which a first valve chamber and a second valve chamber are recessed from an upper surface of the body, and first, second, and third flow paths communicating with the first valve chamber and fourth, fifth, and sixth flow paths communicating with the second valve chamber are formed inside the body;
a first valve member disposed in the first valve chamber and configured to switch between communication and disconnection between the first flow path and the second and third flow paths, while maintaining communication between the second and third flow paths;
a second valve member disposed in the second valve chamber and configured to switch communication and disconnection between the fourth flow path and the fifth and sixth flow paths, while maintaining communication between the fifth and sixth flow paths; and
first and second actuators for driving the first and second valve members, respectively,
wherein the second, third, fifth and sixth flow paths have respective ports on a lower surface of the body, while the first flow path and the fourth flow path have a common port on the lower surface of the body.

2. The valve device according to claim 1, wherein, on the lower surface of the body, the second and fifth flow paths have respective ports on one end side in a first direction, which is a flow direction of the body, the third and sixth flow paths have respective ports on the other end side in the first direction, and the first and fourth flow paths have a common port at a substantially middle position of the lower surface.

3. The valve device according to claim 2, wherein in a top view of the body, the first and second valve chambers are arranged in the first direction of the body, and
through-holes vertically penetrating the body are provided on both end sides of the body in a second direction perpendicular to the first direction.

4. The valve device according to claim 3, wherein two types of through-holes are provided as the through-holes and wherein the two types of through-holes have different diameters.

5. The valve device according to claim 1, wherein the ports of the second, third, fifth and sixth flow paths are different in diameter from the common port of the first flow path and the fourth flow path.

6. The valve device according to claim 1, wherein, in a top view of the body, the second, third, fifth and sixth flow paths and the through-holes are arranged to be symmetrical with respect to the common port of the first and fourth flow paths.

7. The valve device according to claim 1, wherein a total internal volume of the second and third flow paths and a total internal volume of the fifth and sixth flow paths are substantially the same.

8. The valve device according to claim 1, wherein the first and second valve members are diaphragms.

9. The valve device according to claim 1, wherein the first and second actuators are air cylinder actuators.

10. A fluid control device comprising:
- at least two lines arranged in parallel and each including a plurality of fluid devices arranged in one direction via joint blocks, and
- a manifold disposed so as to be orthogonal to the lines and passing between the joint blocks of the lines,
- wherein the plurality of fluid devices includes the valve device as claimed in claim 1,
- the valve device is disposed so as to straddle the manifold,
- the common port of the first and fourth flow paths is connected to a port of the manifold,
- the ports of the second and fifth flow paths are connected to respective lines of fluid devices via joint blocks on one side of the manifold, and
- the ports of the third and sixth flow paths are connected to respective lines of fluid devices via joint blocks on an other side of the manifold.

* * * * *